(12) United States Patent
Nikoulina et al.

(10) Patent No.: US 8,543,563 B1
(45) Date of Patent: *Sep. 24, 2013

(54) DOMAIN ADAPTATION FOR QUERY TRANSLATION

(75) Inventors: Vassilina Nikoulina, Grenoble (FR); Nikolaos Lagos, Grenoble (FR); Stephane Clinchant, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,648

(22) Filed: May 24, 2012

(51) Int. Cl.
*G06F 17/30* (2006.01)
*G06F 7/00* (2006.01)

(52) U.S. Cl.
USPC .................. 707/706; 707/760; 704/2; 704/9

(58) Field of Classification Search
USPC .................. 707/706, 760; 704/4, 10, 2, 7, 9
See application file for complete search history.

(56) References Cited

U.S. PATENT DOCUMENTS

| | | | |
|---|---|---|---|
| 5,987,452 A * | 11/1999 | Kung ..................................... 1/1 | |
| 6,182,026 B1 | 1/2001 | Tillmann et al. | |
| 7,454,326 B2 | 11/2008 | Marcu et al. | |
| 7,624,005 B2 | 11/2009 | Koehn et al. | |
| 7,689,412 B2 * | 3/2010 | Wu et al. ......................... 704/10 | |
| 7,860,706 B2 * | 12/2010 | Abir ................................. 704/4 | |
| 8,234,106 B2 * | 7/2012 | Marcu et al. ....................... 704/2 | |
| 8,255,412 B2 * | 8/2012 | Gao et al. ......................... 707/765 | |
| 8,332,205 B2 * | 12/2012 | Krishnan et al. .................. 704/4 | |
| 8,370,869 B2 * | 2/2013 | Paek et al. ........................ 725/19 | |
| 8,387,030 B2 * | 2/2013 | Brunswig et al. ............. 717/143 | |
| 2003/0154068 A1 * | 8/2003 | Tokuda et al. ..................... 704/7 | |
| 2003/0217052 A1 | 11/2003 | Rubenczyk et al. | |
| 2004/0024581 A1 | 2/2004 | Koehn et al. | |
| 2004/0030551 A1 | 2/2004 | Marcu et al. | |
| 2004/0122656 A1 * | 6/2004 | Abir ................................. 704/4 | |
| 2004/0267760 A1 | 12/2004 | Brundage et al. | |
| 2006/0190241 A1 | 8/2006 | Goutte et al. | |
| 2007/0150257 A1 | 6/2007 | Cancedda et al. | |
| 2007/0265825 A1 | 11/2007 | Cancedda et al. | |
| 2008/0126074 A1 | 5/2008 | Whitelock et al. | |
| 2008/0235202 A1 | 9/2008 | Wang et al. | |
| 2008/0262826 A1 | 10/2008 | Pacull | |
| 2008/0288474 A1 * | 11/2008 | Chin et al. ........................ 707/4 | |

(Continued)

OTHER PUBLICATIONS

U.S. Appl. No. 13/173,582, filed Jun. 30, 2011, Nikoulina, et al.

(Continued)

*Primary Examiner* — Jean M Corrielus
(74) *Attorney, Agent, or Firm* — Fay Sharpe LLP

(57) ABSTRACT

A translation system and method suited to use in Cross Language Information Retrieval employ a retrieval-based scoring function for reranking candidate translations. The method includes translating an input source language query to generate a set of the candidate translations in a target language. The candidate translations are scored with the scoring function, which allows them to be reranked, and an optimal one or more selected for use in querying a domain-specific collection of documents in the target language. The scoring function applies weights to features extracted from the candidate translations. The weights have been learned on features extracted from translated queries, each generated by translation of an original query into the target language, and a measure of information retrieval performance of each the translated queries. One or more of the features used is a domain-specific feature which relies on a corpus of documents in the domain of interest.

26 Claims, 5 Drawing Sheets

(56) References Cited

U.S. PATENT DOCUMENTS

| | | | |
|---|---|---|---|
| 2008/0300857 A1* | 12/2008 | Barbaiani et al. | 704/4 |
| 2009/0024613 A1* | 1/2009 | Niu et al. | 707/5 |
| 2009/0182547 A1* | 7/2009 | Niu et al. | 704/2 |
| 2009/0222437 A1 | 9/2009 | Niu et al. | |
| 2009/0326914 A1 | 12/2009 | Joy et al. | |
| 2010/0070521 A1 | 3/2010 | Clinchant et al. | |
| 2011/0178791 A1 | 7/2011 | Stymne et al. | |
| 2011/0202334 A1* | 8/2011 | Abir | 704/4 |
| 2011/0307245 A1 | 12/2011 | Hanneman et al. | |
| 2011/0320187 A1 | 12/2011 | Motik et al. | |
| 2012/0101804 A1 | 4/2012 | Roth et al. | |
| 2013/0006954 A1* | 1/2013 | Nikoulina et al. | 707/706 |
| 2013/0080152 A1* | 3/2013 | Brun et al. | 704/9 |

OTHER PUBLICATIONS

Hiemstra, et al. "Disambiguation strategies for cross-language information retrieval", ECDL 1999, pp. 274-293.

Koehn, et al. "Moses: open source toolkit for statistical machine translation" Proc. 45$^{th}$ Annual Meeting of the ACL, 2007, Demonstration session, pp. 177-180.

Simard, et al. "Translating with non-contiguous phrases", Proc. Conf. on Human Language Techonology and Empirical Methods in Natural Language Processing, 2005, pp. 755-762.

Crammer, et al. "Ultraconservative online algorithms for multiclass problems", J. Machine Learning Res., 3, p. 951-991, 2003.

Monz, et al. "Iterative Translation Disambiguation for Cross-Language Information Retrieval", SIGIR '05, pp. 520-527.

Chiang, et al. "Online large-margin training of syntactic and structural translation features" Proc., Conf. on Emprical Methods in Natural Language Processing, (EMNLP '08), pp. 224-233.

Watanabe, et al. "Online large margin training for statistical machine translation", Proc. 2007 Joint Conf. on Empirical Methods in Natural Language Processing and Computational Natural Language Learning (EMNLP-CoNLL), 2007, pp. 764-773.

Bertoldi, et al. "Domain adaptation for stastical machine translation with monolingual resources" Proc. Fourth Workshop on Statistical Machine Translation, ACL 2009, pp. 182-189.

Zhao, et al. "Language Model Adaptation for statistical machine translation with structured query models", Proc. 20$^{th}$ Intl. Conf. on Computational Linguistics, COLING 2004, pp. 1-7.

Nikoulina, et al. "Experiments in discriminating phrase-based translations on the basis of syntactic coupling features", Proc. 2$^{nd}$ Workshop on Syntax and Structure in Statistical Translation (SSST '08), pp. 55-60.

Hildebrand, et al. "Adaptation of the translation model for statistical machine translation based on information retrieval" Proc. 10$^{th}$ Conf. of the European Assoc. for Machine Translation (EAMT), May 2005, pp. 133-142.

Axelrod, et al. "Domain adaptation via pseudo in-domain data selection" Proc. 2011 Conf. on Empirical Methods in Natural Language Processing, 2011, pp. 355-362.

Rogati, et al. "Resource selection for domain-specific crosslingual ir", Proc. 27$^{th}$ Ann. Intl. ACM SIGIR Conf. on Research and development in information retrieval, SIGIR '04, pp. 154-161.

Jones, et al. "Domain-specific query translation for multilingual access to digital libraries", 2$^{nd}$ Intl. Workshop on Cross lingual information access addressing the information need of multilingual societies, 2008, pp. 1-5.

Berger, et al. "Selecting Automatically the Best query translations", RIAO2007, pp. 1-14.

Clinchant, et al. "Lexical Entailment for Information Retrieval", Lecture Notes in Computer Science, 2006, vol. 3936, pp. 217-228.

Clinchant, et al. "XRCE's Participation to CLEF 2007 Domain-specific track", Working Notes of CLEF, 2007, pp. 1-15.

Koehn, et al. "Europarl: A parallel corpus for statistical machine translation", MT Summit, 2005, pp. 1-8.

Matusov, et al. "System combination for machine translation of spoken and written language", IEEE Trans. on Audio, Speech, and Language Processing, vol. 16, No. 7, 2008, pp. 1222-1237.

Yom-Tov, et al. "Learning to Estimate Query Difficulty", ACM 2005, pp. 1-8.

Ogilvie, et al. "Experiments using the lemur toolkit", Proc. of the 10$^{th}$ Text Retrieval, 2001, pp. 1-6.

Hauff, et al. "Predicting the Effectiveness of Queries and Retrieval Systems", Ph.D.-thesis series No. 09-161, 2010, pp. 1-179.

* cited by examiner

DOMAIN ADAPTATION FOR QUERY TRANSLATION

BACKGROUND

Aspects of the exemplary embodiment disclosed herein relate to cross language information retrieval and find particular application in connection with a system and method for translation of a query which considers potential ambiguity in the target domain.

Cross-Lingual Information Retrieval (CLIR) systems for retrieving documents in one language based on a query input in another language can provide useful tools, particularly when the domain of interest is largely in a different language from that of an information searcher. The input query is first translated, using an automatic machine translation system, into the language used in the target documents and then input to a search engine for querying a selected document collection.

One problem which arises is that Statistical Machine Translation (SMT) systems designed for general text translation tend to perform poorly when used for query translation. SMT systems are often trained on a corpus of parallel sentences, which have been automatically extracted from a parallel corpus of documents. The documents in the corpus are assumed to be translations of each other, at least in the source to target direction. The trained SMT systems thus implicitly take into account the phrase structure. However, the structure of queries can be very different from the standard phrase structure used in general text: Queries are often very short and the word order can be different from the typical full phrase which would be used in general text. Having a large number of parallel queries would enable training an SMT system adapted to translation of queries. However, no such corpora are available.

Moreover, even if such training data were to be made available, current SMT systems are usually trained to optimize the quality of the translation (e.g., using the BLEU score for assessing the quality of the translations output by the Moses phrase-based SMT system). This means that for a typical task related to query translation, such as Cross-Lingual Information Retrieval (CLIR) the optimization function used is not correlated with the retrieval quality. For example, the word order which is crucial for good translation quality (and is taken into account by most MT evaluation metrics) is often ignored by IR engines.

Conventional CLIR systems often employ components for query translation, document indexing, and document retrieval. While the translation is often considered independently from the retrieval component, several attempts have been made to bring them together. For example, a probabilistic model embeds the query translation step into the retrieval model. See, for example, Hiemstra, D. and de Jong, F., "Disambiguation Strategies for Cross-Language Information Retrieval, ECDL 1999, pp. 274-293. However, this approach requires access to a document index, which is not feasible in the context of a translation service, where the collection to be searched is often unknown.

Another challenge for CLIR is the ambiguity of the translation. This is especially true in the case of using a generic dictionary/translation service when the queries are seeking for domain-specific information (e.g., in the medical, art, or social science fields). For example, in English the word "bank" can refer to a river bank, a savings bank, a blood bank, the verb "to bank", or the like. A query such as "where is the left bank?" may not provide the translation system with the correct context. Corresponding words for "bank" in French include "banque," "banc," and "rive," the best selection depending on the context. The shortness of a query may not provide a conventional translation system with the context needed to resolve the ambiguity.

The exemplary embodiment addresses these problems, and others, by integrating ambiguity-reducing features into a machine translation system by using a reranking framework.

INCORPORATION BY REFERENCE

The following references, the disclosures of which are incorporated herein by reference in its entirety, are mentioned:

U.S. application Ser. No. 13/173,582, filed Jun. 30, 2011, entitled TRANSLATION SYSTEM ADAPTED FOR QUERY TRANSLATION VIA A RERANKING FRAMEWORK, by Vassilina Nikoulina and Nikolaos Lagos, discloses an apparatus and method adapted to cross language information retrieval using a machine translation system trained to provide good retrieval performance on queries translated with the system.

U.S. Pub. No. 20100070521, published Mar. 18, 2010, entitled QUERY TRANSLATION THROUGH DICTIONARY ADAPTATION, by Stephane Clinchant, et al., discloses cross-lingual information retrieval by translating a received query from a source natural language into a target natural language; performing a first information retrieval operation on a corpus of documents in the target natural language using the translated query to retrieve a set of pseudo-feedback documents in the target natural language; re-translating the received query from the source natural language into the target natural language using a translation model derived from the set of pseudo-feedback documents in the target natural language; and performing a second information retrieval operation on the corpus of documents in the target natural language using the re-translated query to retrieve an updated set of documents in the target natural language.

BRIEF DESCRIPTION

In accordance with one aspect of the exemplary embodiment, a translation method includes receiving an input query in a source language and, with a machine translation system, translating the query to generate a set of candidate translations of the query in a target language. A set of features is extracted from each of the candidate translations in the set, the set of features including at least one domain specific feature which is based on a comparison of at least one term in the candidate translation with words in a domain-specific corpus of documents. The method further includes scoring each of the candidate translations with a scoring function in which the extracted features are weighted with respective weights. The weights have been learned on features extracted from translated queries generated by translation of an original query into the target language and a measure of information retrieval performance of each the translated queries, for each original query in a set of original queries. A target query is output, based on the scores of the candidate translations.

In accordance with another aspect of the exemplary embodiment, a query translation system includes a decoder which receives a source query in a source language and outputs a set of candidate translations in a target language, each of the candidate translations being a translation of the same source query and a reranking component which outputs a target query based on at least one of the candidate translations. The reranking component extracts features of each of the candidate translations and computes a function in which the extracted features are weighted by feature weights. The weights have been learned on features of each of a set of translated queries generated by translation of an original query into the target language and a measure of information retrieval performance of each the translated queries, for each original query in a set of original queries. At least one of the features is a domain-specific feature. A processor implements the reranking component.

In accordance with another aspect of the exemplary embodiment, a method for training a translation system for translation of queries includes, for each of a set of original queries in a source language, translating the query to generate a set of translations in a target language. For each translation in the set of translations, values of features are extracted for each of a finite set of features, at least one of the features comprising a domain-specific feature which relies on a domain-specific corpus. A measure of retrieval performance is obtained for each translation. A feature weight for each of the features is learned, based on the extracted values of the features and the respective measure of retrieval performance of each translation. The feature weights are stored for use in translating a new query, different from each of the original queries, from the source language to the target language, whereby candidate translations of the new query are ranked based on their extracted values of features and the stored feature weights.

DETAILED DESCRIPTION

Figure 1:
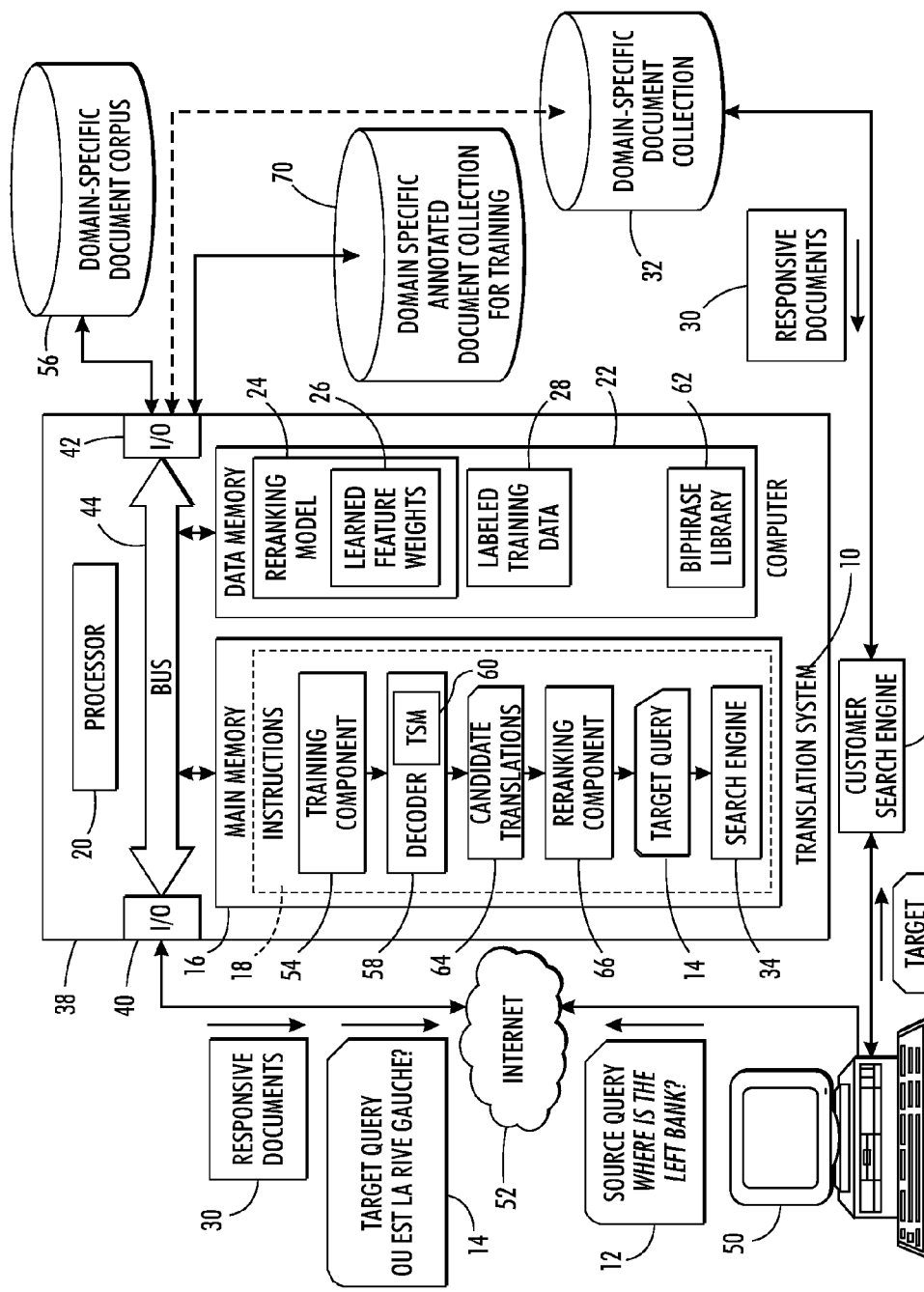
FIG. 1 is a functional block diagram of an environment in which an exemplary system for query translation operates in accordance with one aspect of the exemplary embodiment.

The exemplary apparatus and method find application in domain-specific query translation. The apparatus is configured for utilizing a conventional generic machine translation (MT) system/service. Such an MT system is typically created for full text translations, rather than for translating queries and is not adapted for a specific domain, which can lead to ambiguous translations.

A system and method for translation of queries which may be adapted for use herein is described in above-mentioned application Ser. No. 13/173,582. Advantages of such a system are that it can address the issue of genre adaptation and domain adaptation at once, and is adaptable to any generic MT system, or a combination of different MT systems. The machine translation system can be treated essentially as a black box, since it is not necessary to modify its operation for this application. Moreover, the system can be used with any suitable information retrieval (IR) engine and can be complementary to different query expansion techniques (e.g., pseudo relevance feedback) that are generally useful in CLIR. See, for example, above-mentioned U.S. Pub. No 20100070521.

Thus, a content provider can adapt a translation service (or a combination of different translation services) to a specific domain of search.

The exemplary reranking framework employed by the exemplary system and method and which is described in application Ser. No. 13/173,582 can be summarized as follows:

1. A baseline (e.g., generic) MT system generates a list of candidate translations GEN(q) for each input query q;

2. A vector of features F(t) is assigned to each translation t∈GEN(q);

3. The best translation(s) $\hat{t}$ is/are chosen as the one(s) optimizing (e.g., maximizing) the translation score $S_{\hat{t}}$, which can be defined as a weighted linear combination of features:

$$S_{\hat{t}}(\lambda) = \mathrm{argmax}_{t \in GEN(q)} \lambda \cdot F(t) \qquad (1)$$

As shown in Eqn. 1 above, the best translation is selected according to the feature weights $\lambda$. In order to learn the weights $\lambda$ which maximize the retrieval performance, an appropriate training set of documents is annotated based on relevance. The retrieval score annotations are based on the document relevance annotations, which may be performed by human annotators.

The annotated training set is created using queries $\{q_1, \ldots, q_K\}$ with an Nbest list of translations $GEN(q_i)$ of each query $q_i$, $i \in \{1 \ldots K\}$ as follows:

1. A list of N (where N is at least 10 or at least 100, e.g., N=1000) translations ($GEN(q_i)$) is produced by the baseline MT model for each query $q_i$, i=1 ... K.

2. Each translation $t \in GEN(q_i)$ is used to perform a retrieval from a target document collection, and an Average Precision score (AP(t)) is computed for each $t \in GEN(q_i)$ by comparing its retrieval to the relevance annotations provided.

The weights $\lambda$ are learned with the objective of maximizing mean average precision (MAP) for all the queries of the training set, and, therefore, are optimized for retrieval quality.

The domain adaptation used in the exemplary method is performed via introduction of domain-specific features F(t) and corresponding feature weights $\lambda$ in the reranking framework (into Eqn. (1)). These can include features based on bilingual in-domain resources (e.g., dictionaries, terminology, statistics extracted from an in-domain parallel corpus etc.) and/or features based on a monolingual in-domain corpus. For example, in the case of the in-domain dictionary available, each pair source query/query translation can receive a feature counting a number of source/target word pairs present in the dictionary: it will favor translations having more in-domain words. These features can then be integrated in the same framework.

A query, as used herein, includes a text string, such as a phrase or a sentence, often comprising only a few words, generally of ten words or less, which is used to retrieve responsive documents from a document collection. The documents retrieved generally include text documents in a natural language. In the exemplary embodiment, the optimization objective function of SMT systems is optimized based on information retrieval (IR) metrics via a reranking framework.

A document, as used herein can be any stored text in a natural language, such as an entire stored document or portion thereof. Some documents may include images as well as text. A document can thus be any one or more of a text file, PDF, XML, or other structured or semi-structured document, an image or a video/audio file, with a short description in natural language, or the like, from which a text string can be extracted.

FIG. 1 illustrates an exemplary query translation system 10 in accordance with one aspect of the exemplary embodiment.

The system 10 is adapted to receiving an input query (source query) 12 in a first natural language (source language), such as English, and outputting an output query (target query) 14 in a second natural language (target language) different from the first natural language, such as French (in the example). The output query is selected from a set of possible translations based on computed domain-specific features and associated weights.

The system includes main memory 16 which stores instructions 18 for performing the exemplary method(s) described herein and a processor 20 in communication with the memory 16 for executing the instructions. Data memory 22, which may be separate from or integral with the main memory 16, stores a reranking model 24 which includes a set of feature weights 26 which have been learned on training data 28. The exemplary training data 28 includes features of target queries and corresponding relevance scores of the documents retrieved with them. Once the feature weights 26 have been learned, the training data 28 can be omitted from the system. The output query 14 can be used for retrieving responsive documents 30 from a document collection 32, e.g., by a search engine 34 stored locally, e.g., in memory 16, or by a search engine 36 stored remotely, to which the system 10 has no access. The exemplary document collection 32 is a domain-specific document collection, i.e., one in which the documents in the collection predominantly relate to a specific domain of interest. For example, the domain may be medical, e.g., healthcare related, scientific, legal, e.g., litigation, cultural, or more specific, such as a collection of documents relating to French culture in the exemplary embodiment illustrated in FIG. 1.

The exemplary translation system 10 is resident on one or more computing devices 38 and includes one or more input/output (I/O) devices 40, 42 for communicating with external devices. Hardware components 16, 20, 22, 40, 42 of the system 10 may be communicatively linked via a data/control bus 44.

The input query 12 can be input to the system 10 in any suitable form, e.g., from a client device 50, connected with the system via a wired or wireless link 52, such as a wired connection, local area network, or wide area network, such as the Internet. In other embodiments, the query is input to the system from a memory storage device, such as a disk or memory stick, or is generated within the system 10, itself. In some embodiments, where the system is configured for query translation suited to more than one domain, the user may be asked to select a domain for the query from a predetermined set of two or more proposed domains.

The system 10 includes, e.g., stored in memory 16, or accesses from remote memory, various software components. These include a training component 54, for learning the feature weights 26 of the reranking model 24, in part with the aid of a domain-specific corpus 56 of documents in the target language. Since the system 10 may not have access to the document collection 32 to be searched, the documents in the collection 56 may be different from those found in the collection 32, although in other embodiments, there may be at least some overlap between the collections. The system 10 also includes a decoder 58, as is conventionally used in a phrase-based statistical machine translation (SMT) system with a translation scoring module (TSM) 60. The SMT system 58 has access to a biphrase library 62 which stores source-target phrase pairs.

The domain-specific corpus 56 includes a large number, such as at least 100 or at least 1000 documents in the specific domain of interest and, as a result, there may be words/phrases present in the corpus 56 that are not in common usage in a more general corpus, words/phrases which tend to be used in a different sense than in a general corpus, and/or words/phrases which are found with much lower frequency than in a general corpus. Accordingly, the domain-specific corpus 56, if it were to be used to create a biphrase library of the type used by the generic MT system 58, would produce different biphrases and/or different corpus statistics for the biphrases. The reranking framework and availability of a monolingual domain-specific corpus 56 avoids the need to create such a domain-specific biphrase library and to train the MT system 58 on domain-specific parallel corpora.

Using biphrases extracted from the biphrase library 62 in combinations scored by the TSM 60, the decoder 58 outputs a set 64 of candidate translations of the query 12 in the target language, which are input to a reranking component 66. The candidate translations 64 of the input query 12 may also be referred to herein as candidate queries as they can be used for querying a document collection, although in some cases, a target query can be generated by combining two or more candidate translations. The reranking component 66 ranks the set of candidate translations 64, based on their predicted retrieval performances. This is performed with the trained model 24 (incorporating the previously learned feature weights 26) and features extracted based on the candidate translations 64. The ranking is performed to find an optimal one or set of optimal translations from among the candidate translations 64. The reranking component 66 outputs a target query 14 based on one or more of the optimal candidate translations 64, e.g., to the search engine 34 or to an external device, such as client device 50. The target query 14 may thus be a single optimal one of the candidate translations 64 or a combination (e.g., concatenation) of two or more of the candidate translations 64. The exemplary reranking component 66 may be incorporated into the decoder 58 or be a separate component, allowing the SMT 58 to be treated as a black box.

The computer system 38 may be a PC, such as a desktop, a laptop, palmtop computer, portable digital assistant (PDA), server computer, cellular telephone, tablet computer, pager, combination thereof, or other computing device capable of executing instructions for performing the exemplary method. In some cases, software components may be wholly or partly resident on the client computing device. Client device 50 may be configured similarly to the computer system 38, i.e., with memory, a processor, and one or more interfaces for communicating with external devices.

The memory 16, 22 may represent any type of non-transitory computer readable medium such as random access memory (RAM), read only memory (ROM), magnetic disk or tape, optical disk, flash memory, or holographic memory. In one embodiment, the memory 16, 22 comprises a combination of random access memory and read only memory. Memory 16, 22 stores instructions for performing the exemplary method as well as the processed data. In some embodiments, the processor 20 and memory 16 and/or 22 may be combined in a single chip. The exemplary network interface 40, 42 allows the computer to communicate with other devices via a computer network and may comprise a modulator/demodulator (MODEM).

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer 38, executes instructions stored in memory 16 for performing the method outlined in FIGS. 2 and 3.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
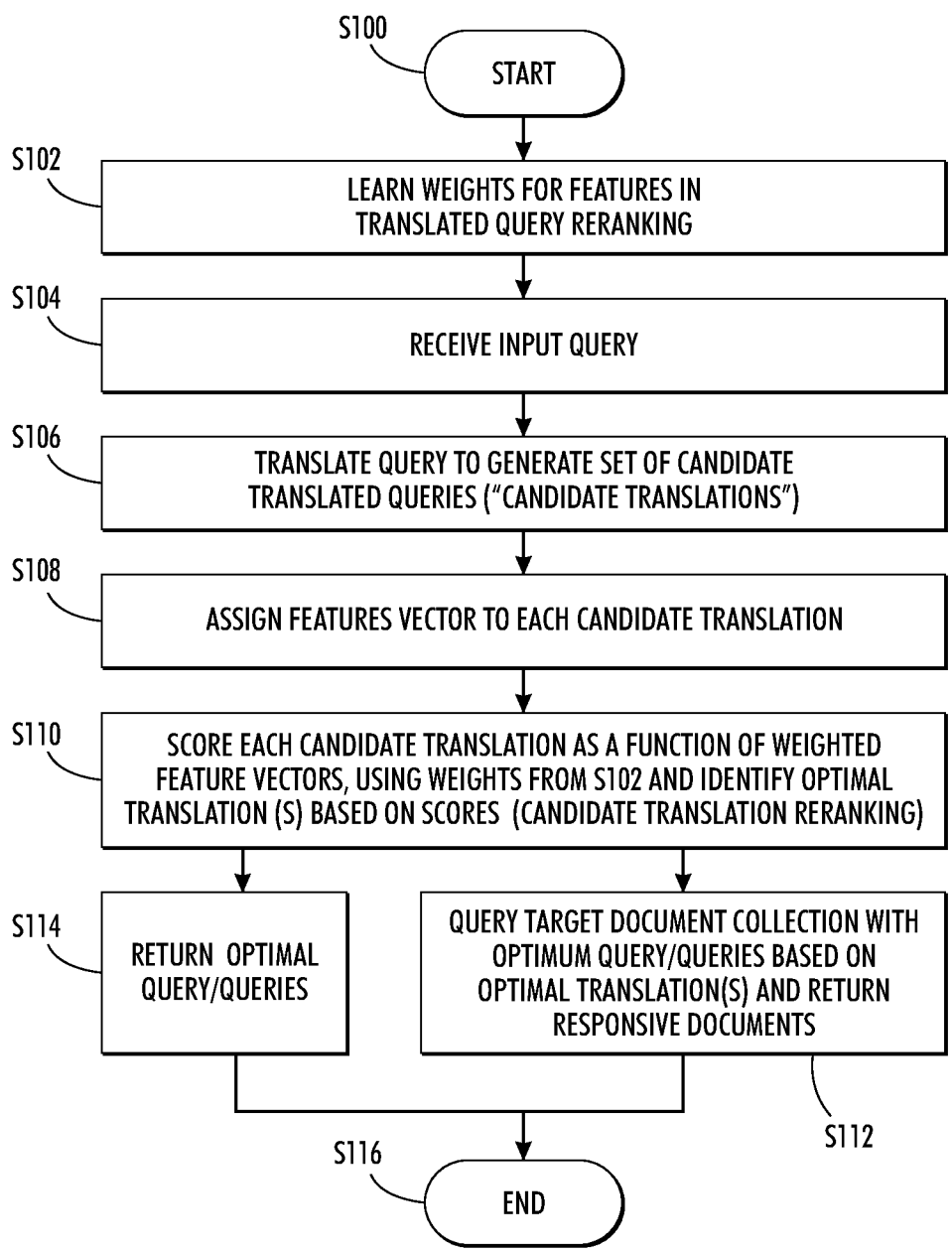
FIG. 2 is a flow chart illustrating a method for query translation in accordance with another aspect of the exemplary embodiment.

FIG. 2 illustrates steps of the exemplary method. The method begins at S100.

At S102, feature weights (λ) 26 for each of a set of two or more (generally at least 10 or more) features for a finite set of features are learned, by the training component 54. The learning uses training data 28 in which translated queries 82 (FIG. 5) in the target language are associated with a measure of their information retrieval performance (e.g., retrieval scores). In the exemplary embodiment, retrieval performance is based on the relevance, to the original source language query, of a set of documents retrieved in response to the translated query. One or more of the features is a domain-specific feature which is computed based on occurrences (or lack of) of terms in the query in the domain-specific corpus 56.

At S104, a new query 12 is received from a user in the source language.

At S106, the query 12 is translated with the decoder 58 to produce a set of candidate translations 64 in the target language.

At S108, a feature representation F(t), such as a features vector which represents a value for each features of the set of features in the finite set of features, is assigned to each translation t in the set 64 of candidate translations.

At S110, an optimal translation $\hat{t}$ (or optimal set of translations) is chosen from the set 64 of candidate translations, by identifying the translation (candidate translation) $t_i$ which provides the highest translation score, based on a scoring function for the respective features vector, using the weights determined in S102 and feature values computed at S108.

In the exemplary embodiment, the optimum translation $\hat{t}$ is the one which maximizes the translation score $S_{\hat{t}}$, over all translations t in set 64. The translation score can be defined as a weighted linear combination of the values of the features $F(t_i)$:

$$S_{\hat{t}}(\lambda) = \mathrm{argmax}_{t \in GEN(q)} \lambda \cdot F(t) \quad (1)$$

where t∈(GEN(q)) represents a candidate translation generated from a source query q and λ represents the set of feature weights, one weight for each of the features in F(t), and • represents the dot product.

In the exemplary embodiment, the feature weights λ are learned (in S102) to optimize an overall measure of retrieval performance, such as the Retrieval Mean Average Precision (MAP) on the training set 26 over all training queries in the source language, as described in greater detail below with respect to FIG. 3.

At S112, the optimal translation $\hat{t}$ (or set of translations) output at S110 is/are optionally used as query 14 to query a domain-specific document collection 32 (the same domain as considered in training) to retrieve responsive documents, some or all of which may be returned to the user, e.g., to client device 50, or other memory storage device.

The user may prefer to keep indexing and searching at their premises (using their own search engine). In this case, at S114, the query 14 may be returned to a user for review and possible modification by the user. In this case, access to the document collection 32 to be searched may be possible at retrieval time only via the user's search engine 36. Or, the user may be provided with the opportunity to review and revise the translated query 14 before it is input to the search engine 34.

The method ends at S116.

Aspects of the system and method will now be described in further detail.

The Machine Translation System

The decoder 58 used in S106 can be any conventional machine translation system, such as one which includes or accesses a translation scoring model (TSM) 60 which has been trained, on a conventional parallel corpus of text documents in the source and target languages, to output a translation of new source text in the target language. The exemplary text documents used in training the decoder 58 are predominantly not in the form of queries, i.e., are complete sentences in conventional text comprising a large number of such sentences, e.g., in paragraph format, and may be drawn for a general parallel corpus.

In the illustrated embodiment, the trained phrase-based SMT system 58 receives the input query 12 and tokenizes it, i.e., identifies a sequence of tokens. These tokens are the source language words and other tokens, such as numbers and punctuation, which make up the text string of the input query 12. The decoder 58 has access to the biphrase library, 62, e.g., stored in memory 22, which includes pairs of phrases (biphrases) which have been automatically determined to be a translation of each other (based on automatic processing of the parallel corpus of text documents). In decoding the input query 12, the decoder 58 may retrieve a large number of such biphrases from the library 62 which cover one or more of the source words of the query 12, including, for example, the biphrases (bank, banque) and (where is, ou est) in the case of the exemplary query: where is the left bank, shown in FIG. 1. Each of the retrieved biphrases thus includes one or more of the source words in query 12 and includes one or more corresponding words in the target language.

The decoder 58 uses the translation scoring model 60 to rank combinations of these retrieved biphrases to find a combination in which each word of the source query 12 is covered by no more than one of the biphrases. Some words or other tokens may not be recognized in the library 62 and are thus not covered by any of the biphrases. These unrecognized tokens may thus be preserved in their original format in the candidate translation 64.

Since there are generally many different biphrase combinations, the decoder 58 is able to output a set of candidate translations 64 in the target language which are ranked highly by the translation scoring model 60. See, for example, the examples shown in FIG. 4. In normal operation the decoder 58 would output only the most highly ranked one as the translation. However, in the exemplary embodiment, the decoder outputs an Nbest list (a set of the highest scoring translations, as determined, for example, with the TSM). For example, the top 100 (or more) candidate translations 64 of the query 12 are output, such as at least 200 candidate translations, or more. There is no specific limit for the maximum number of candidate translations that are output and it can be up to 10,000, or more. In the exemplary embodiment, a maximum of about 1000 candidate translations is output for each input query (N=1000). Of course, if the query 12 is short, the SMT system 58 may output fewer candidate translations than the preset maximum, and in rare cases, as few as one candidate translation, e.g., if there is only one bi-phrase which covers the input query. However, in general, the SMT system is able to output a plurality of candidate translations 64, and for most queries 12, at least 10 candidate translations are output to the reranking component 66.

As will be appreciated from the description below, the same translation procedure as described above can be used in the training the reranking component (S102), although in that case, the decoder 58 is applied to training queries in the source language.

In the following examples, the Moses SMT system is used as the decoder 58 in S106 (see http://www.statmt.org/moses/ and Koehn, et al., "Moses: open source toolkit for statistical machine translation," in Proc. 45th Annual Meeting of the ACL, demonstration session, pp. 177-180, Prague, Czech Republic (2007)). However, it is to be appreciated that other SMT systems may be used, such as the phrase based machine translation systems disclosed, for example, in the following patents and applications, the disclosures of which are incorporated herein in their entireties, by reference: U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al., U.S. Pub. No. 2004/0024581 entitled STATISTICAL MACHINE TRANSLATION, by Koehn, et al., U.S. Pub. No. 2004/0030551 entitled PHRASE TO PHRASE JOINT PROBABILITY MODEL FOR STATISTICAL MACHINE TRANSLATION, by Marcu, et al., U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/0150257, published Jun. 28, 2007, entitled MACHINE TRANSLATION USING NON-CONTIGUOUS FRAGMENTS OF TEXT, by Nicola Cancedda, et al.; U.S. Pub. No. 2007/0265825, published Nov. 15, 2007, entitled MACHINE TRANSLATION USING ELASTIC CHUNKS, by Nicola Cancedda, et al.; U.S. application Ser. No. 12/690, 504, filed on Jan. 1, 2010, entitled STATISTICAL MACHINE TRANSLATION SYSTEM AND METHOD FOR TRANSLATION OF TEXT INTO LANGUAGES WHICH PRODUCE CLOSED COMPOUND WORDS, by Sara Stymne, et al.; U.S. application Ser. No. 12/814,657, filed on Jun. 14, 2010, entitled WORD ALIGNMENT METHOD AND SYSTEM FOR IMPROVED VOCABULARY COVERAGE IN STATISTICAL MACHINE TRANSLATION, by Gregory Hanneman, et al. U.S. application Ser. No. 12/911,252, filed on Oct. 25, 2010, entitled MACHINE TRANSLATION USING OVERLAPPING BIPHRASE ALIGNMENTS AND SAMPLING, by Benjamin Roth, et al., Simard, et al., "Translating with non-contiguous phrases," in Proc. Conf. on Human Language Technology and Empirical Methods in Natural Language Processing, pp. 755-762, Vancouver, British Columbia, Canada (2005)), and combinations thereof. Methods for building libraries of parallel corpora from which bilingual dictionaries, such as biphrase library 62 can be generated are disclosed, for example, in U.S. Pub No. 2008/0262826, published Oct. 23, 2008, entitled METHOD FOR BUILDING PARALLEL CORPORA, by Francois Pacull, the disclosure of which is incorporated by reference in its entirety.

Figure 4:
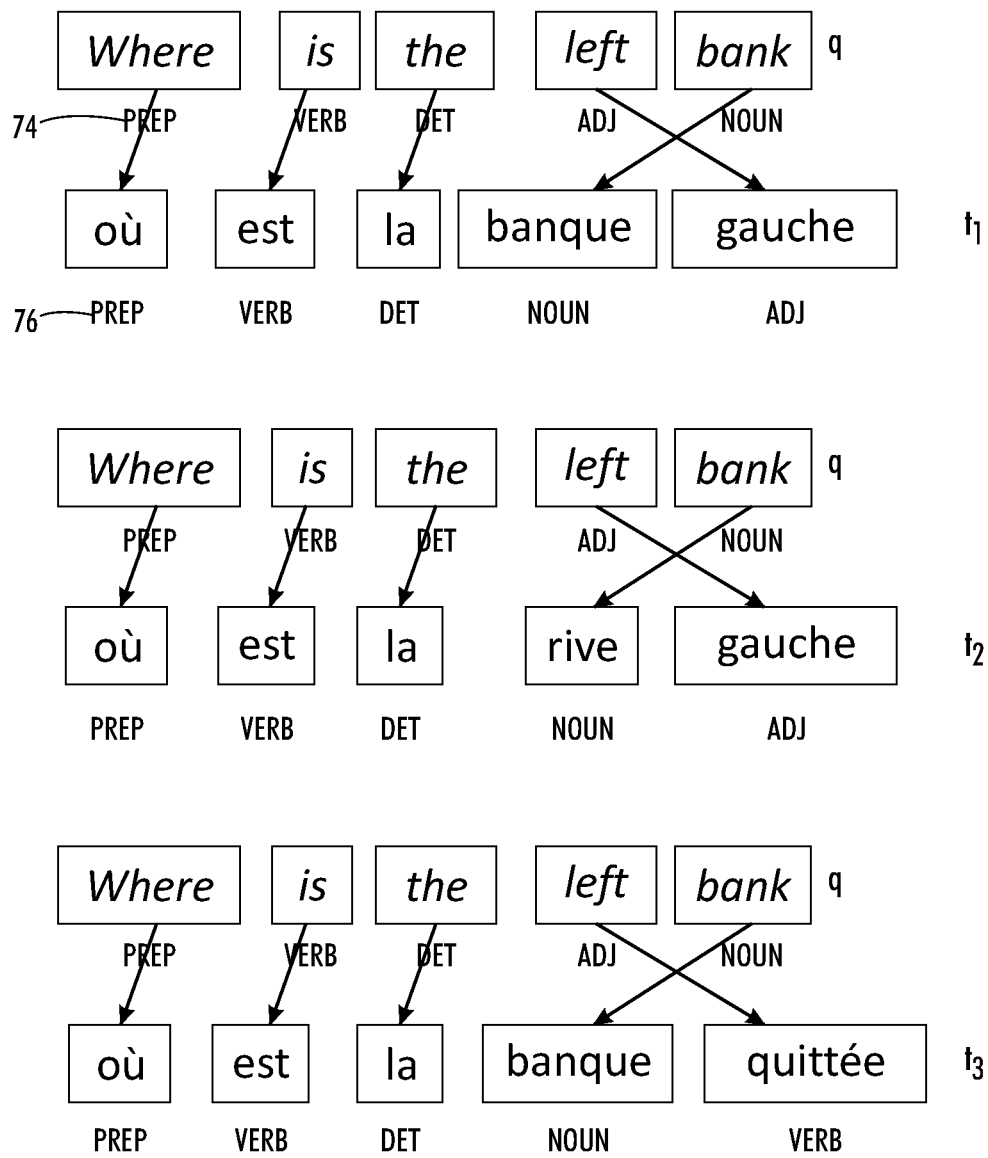
FIG. 4 illustrates example translation pairs used in training of the reranking component.

FIG. 4 illustrates a set of candidate translations (candidate queries) 64 from the example query q as $t_1$, $t_2$, and $t_3$, for illustration purposes. In the output of the SMT system 58, an alignment may be provided (shown by the arrows between words) in each translation pair (q, $t_1$), (q, $t_2$), etc. The alignment indicates which element (word(s)) of the query q is aligned with which element (word(s)) of the candidate translation t in the translation pair. Thus, for example, the decoder 58 indicates, for translation pair q,$t_1$, that the fourth word of the query left is aligned with the last (fifth) word of the candidate translation gauche. The decoder 58 may also provide parts-of-speech (POS) 74, 76, etc. for each of the words in each translation pair. Thus, for example, the pair of elements left, gauche is labeled with (ADJ, ADJ). In other embodiments, a separate component provides the POS labeling. More complex POS labeling is also contemplated. For example, a parser may be used to identify dependencies between words and these may be incorporated into the POS, such as subject-object dependencies, heads of noun phrases, verb tenses, and the like.

These POS labels may be used in computing features, as described in greater detail below.

Learning Weights (S102)

In the exemplary embodiment, the feature weights λ are learned in S102 to optimize retrieval performance on the training set, e.g., to optimize an overall retrieval score, such as the Retrieval Mean Average Precision (MAP), on translated queries. The average precision, for a candidate translation, can be computed as the retrieval precision, optionally taking into account the rank of the relevant documents for each query. In the exemplary embodiment, a simple binary rank is used for the top retrieved documents from a training collection 70, i.e., relevant or not relevant to the query, however, it is to be appreciated that more refined ranking scheme may be used.

Figure 5:
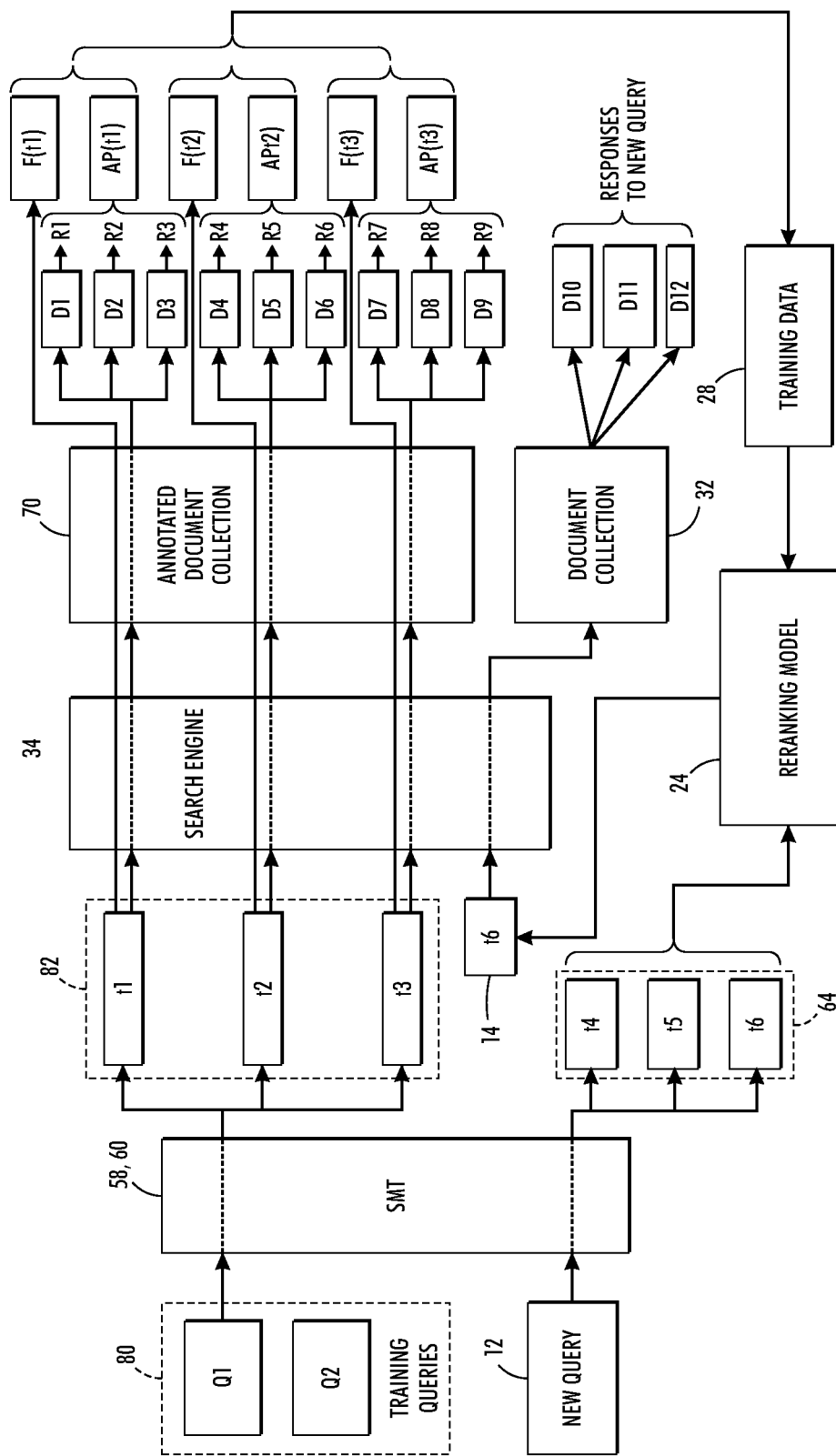
FIG. 5 graphically illustrates various elements of the system and method.

As illustrated in FIG. 5, the learning involves the presence of a labeled training set 80 of source language queries where a retrieval score, such as the average retrieval precision AP, for each translation 82 of each source query is available. For example, at training time, both access to a domain-specific document collection 70 and the presence of relevance annotations for the queries of the training set are available. For example, each document in collection 70 includes an annotation indicating to which of the training queries 80 it is relevant. Once the feature weights 26 for the reranking model 24 are learned, the model 24 can be reused for query translation independently of the annotated document collection 70. As will be appreciated, the annotated document collection 70 may form a part of the monolingual domain specific document corpus 56, or vice versa.

Figure 3:
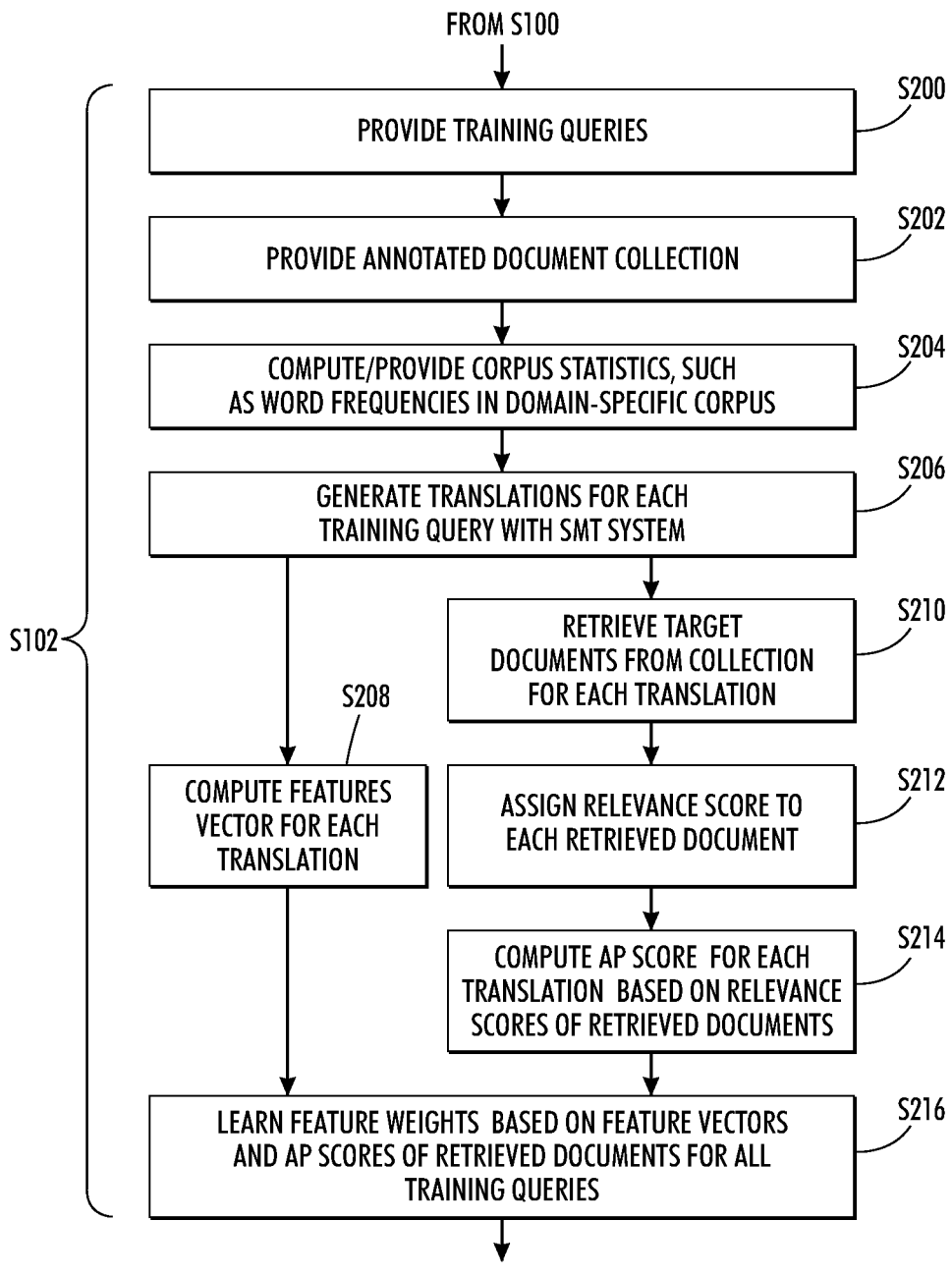
FIG. 3 is a flow chart illustrating an exemplary method for training a reranking component for the query translation method of FIG. 2, in accordance with another aspect of the exemplary embodiment.

With reference to FIGS. 3 and 5, the learning of the weights may proceed as follows. At S200, a set 80 of training queries (Q1, Q2, etc.) is provided. The training queries (original queries) 80 are queries in the source language, as for the input query 12, e.g., generally of ten (10) words or less. At S202, an annotated collection of target language documents 70 may be provided. These are documents which are labeled according to their responsiveness to each training query in the set 80.

In one embodiment, a pre-generated dataset, e.g., a parallel dataset of queries in source and target languages can be used to provide the training queries and annotated documents in S200 and S202. One such dataset can be generated from the AdHoc-main, AdHoc-TEL and/or GeoCLEF tracks of one or more years of the CLEF challenge data (see, World Wide Web at clef-campaign.org/). Each track contains about 50 multilingual queries, which are referred to as "topics". A large number, e.g. several hundred, of these parallel topics can then be used for training of the reranking component 66. As will be appreciated, only the source topics in the language of interest are needed as the training queries, however, the target topics can be used to evaluate the relevance of the retrieved documents, in some embodiments. Each query has been manually labeled with a reference to documents in the training corpus 70 that are responsive to it. In practice, the human annotations for the documents in the training corpus 70 need not be provided for all the documents, but only for a representative subset of documents. For further details on the annotation process, see "What happened in CLEF 2009. Introduction to the Working Notes" by Carol Peters, available on the world wide web at clef-campaign.org/2009/working_notes/CLEF2009WN-Contents.html. An advantage of using such training data 28 is that it has been prepared so that new SMT systems can be evaluated against each other and the documents retrieved are already labeled according to responsiveness to the training query. However, such data may not be available for the source/target language pair or even suitable. For example, when the type of queries or document collection to be queried are for a specific domain, it may be more appropriate to train the reranking component on a domain-specific annotated document collection 70, which may be generated from collection 32, e.g., with documents provided by or selected by the client. The training queries 80 may alternatively or additionally be generated manually or may be automatically acquired from a system which receives queries from a variety of users for the collection 32.

Given the training set 80 of training queries and annotated documents 70, training data 28 for the reranking model training may then be generated, as follows:

At S204, statistics for the domain-specific monolingual document corpus 56 may be precomputed. For example, term frequencies (over the collection as a whole) and document occurrences (number of documents in which the term appears) for each a set of text terms (single words, phrases, or lemma forms thereof) in documents forming a domain-specific target corpus is computed. This may be performed on the training collection 70 or on an enlarged corpus of documents, such as corpus 56. In the illustrated embodiment, for example, the frequency and/or occurrence of the words banque, banc, and rive may be computed for the domain-specific corpus 56, their lemma forms, as well as frequencies in n-grams (sequences of n words) in which the words/lemma forms occur, where n can be for example, 1, 2, 3, 4, 5, or more. The frequency is thus dependent on the content of the documents in the domain-specific corpus 56. For example, if the domain is French culture, rive and rive gauche may each have a higher respective frequency in the domain-specific corpus 56 containing documents related to French culture than in a scientific domain-specific corpus. Alternatively, these statistics may be computed on-the-fly, as needed, in S208.

At S206, a set 82 of translations ($t_1$, $t_2$, $t_3$, etc.) is produced by the SMT system 58 for each source topic (i.e., for each training query Q1, Q2, Q3, etc.). For example, at least 100 or 200, e.g., about 1000 translations are generated for each training query, in the same way as described above for the input query 12.

At S208, for each translation ($t_1$, $t_2$, $t_3$, etc.) of each training query, features (examples of which are described below), are computed, to provide a respective features representation ($F(t_1)$, $F(t_2)$, $F(t_3)$). This may include determining a value for each of a predefined set of features, based on the words in the translation. In the exemplary embodiment, at least one of the features is a domain specific feature. One or more additional features rely on the alignments produced by the SMT system 58 (e.g., Moses baseline system), as illustrated in FIG. 4. A features vector which includes a value for each of the predetermined set of features can thus be generated for each translation.

At S210, each translation ($t_1$, $t_2$, $t_3$, etc.) of each query is used to perform retrieval from the annotated domain-specific document collection 70 in the target language. Any suitable search engine 34 can be used for this purpose, such as the lemur toolkit (see the World Wide Web at lemurproject.org/).

At S212, the documents (D1, D2, D3, D4, D5, D5, D7, D8, D9, etc.) retrieved by the search engine from collection 70, using the translations ($t_1$, $t_2$, $t_3$, etc.) as queries, are then each assigned a relevance score (R1, R2, R3, R4, R5, R5, R7, R8, R9, etc.). In one embodiment, this can be performed manually, by comparing the retrieved document to the original training query and determining if it is relevant or not (e.g., assigning a 0 for not relevant and a 1 for relevant). In another embodiment, a human experienced translator translates the original source training query into the target language to generate a reference query (i.e., a query in the target language which has been translated by a means other than the SMT system 10). The relevance (R1, R2, R3, R4, R5, R5, R7, R8, R9, etc.) can then be manually assessed with reference to the reference query. In the exemplary embodiment, this can be achieved with the relevance annotations provided during a corresponding CLEF campaign. For example, the documents in the collection 70 are already labeled with an indication of whether or not they are relevant to each particular topic (training query in the source/target language) and this information can be used to assign the relevance scores to the retrieved documents.

Then, at S214, each translation ($t_1$, $t_2$, $t_3$, etc.) receives a corresponding precision score ($AP(t_1)$, $AP(t_2)$, $AP(t_3)$, etc.) based on the relevance scores of each of the retrieved documents in the set. For example, the top n (e.g., n=20) documents retrieved by the search engine 34 for each translation are considered in computing a measure of retrieval performance (e.g., the Average Precision, AP). In one embodiment, the rank by the search engine 34 is not considered in computing the precision score AP. For example, if 5 of the n documents retrieved in response to translation $t_1$ are annotated as "relevant" to the original training query q, then the average precision AP for this translation $t_1$ is computed as 5/20=0.25. In other embodiments, the rank of each retrieved document is taken into account. For example, the top document retrieved by the search engine 34 is given the highest rank, with a rank score of, for example 20, and the remaining 19 documents are each ranked with sequentially decreasing rank scores, in order. The average precision AP is then the sum of the rank scores multiplied by the respective relevance scores. The features and corresponding precision score AP for each translation form the training data 28 which, for each query Q1, Q2, etc. is used to train the reranking model 24.

At S216, the feature weights A for the model 24 are learned based on the feature vectors computed at S208 and the AP scores of the translations computed at S214. In the exemplary embodiment, the learning is performed with the objective of maximizing the average precision over all the topics (training queries) of the training set. Any suitable machine learning method can be used for this purpose, such as Structured perceptron based methods, Kernel-based learning methods, neural networks, and the like. One suitable algorithm is the margin infused relaxed algorithm (MIRA), an extension of the perceptron algorithm, which is suited to multi-class problems. This algorithm can learn a set of parameters (here, the feature weights of the vector) by processing all the given training examples one-by-one and updating the feature weights with each training example, so that the current training example is classified correctly with a margin against incorrect classifications at least as large as their loss. The change of the feature weights in each iteration is generally to be kept as small as possible. Such an update is done for each translation, and several iterations are possible through the whole training set. For further details on the MIRA algorithm, see Crammer, et al., "Ultraconservative Online Algorithms for Multiclass Problems," in *J. Machine Learning Res.*, 3, 951-991 (2003). As an example, an implementation of MIRA proposed by Chiang, et al., "Online large-margin training of syntactic and structural translation features," in *Proc. Conf. on Empirical Methods in Natural Language Processing*, (EMNLP '08), pp. 224-233 (ACL 2008), which can be used herein. Application of the MIRA algorithm to statistical machine translation is also described, for example, in Taro Watanabe, et al., "Online large margin training for statistical machine translation," in Proc. 2007 Joint Conf. on Empirical Methods in Natural Language Processing and Computational Natural Language Learning (EMNLP-CoNLL), pp. 764-773 (ACL 2007). MIRA is an online learning algorithm where each weight's update is done so as to keep the new weights as close as possible to the old weights (first term), and score an oracle (best possible) translation ($t^*_i$) higher than each non-oracle translation ($t_{ij}$) by a margin at least as wide as the loss $l_{ij}$ (second term):

$$\lambda = \min_{\lambda'} \frac{1}{2}\|\lambda' - \lambda\|^2 + C \sum_{i=1}^{K} \max_{j=1 \ldots N} (l_{ij} - \lambda' \cdot (F(t^*_i) - F(t_{ij})))  \quad (2)$$

The loss $l_{ij}$ is defined as the difference in the retrieval average precision between oracle and non-oracle translations: $l_{ij}=AP(t^*_i)-AP(t_{ij})$. C is a regularization parameter, which can be chosen via 5-fold cross-validation.

The feature weights λ are thus learned so that the best translations of the queries (those with the highest AP) are ranked higher on average, by the reranking component, than those with lower AP scores. In one embodiment, the feature weights λ are learned in S216 to optimize the Retrieval Mean Average Precision (MAP) on the training set. The MAP score is simply the mean value of all AP scores. In one exemplary embodiment, the average of all the parameters (voting version) is used. In this embodiment, the averages of each of the weights generated through all the iterations are taken as the feature weights λ. Thus, the weights bringing more translations higher in the list have more impact on the average score. This makes the algorithm more robust. In one embodiment, the weights which, on average would minimize the number of retrieval errors on the training set (which is not necessarily maximization of the MAP score, but it improves the final MAP score in practice) is used. As will be appreciated, in other embodiments, the weights learned after a number of iterations of the algorithm or at a point when improvements in the retrieval are no longer significant can be used.

Thus, for example, assume a translation $t_3$ under consideration has a features vector (1,0,1,0,1,1,1,0,0,1) for ten example features and the feature weights (e.g., normalized to add to 1) are currently all set at 0.1 (just for illustration only), then its translation score $S_{t_3}$, based on Eqn. 1, is 0.6. This translation should therefore have an AP score $AP_{t_3}$ which is higher than that of a previous translation $t_1$ with a translation score which is lower than 0.6 and/or an AP score which is lower than a previous translation $t_2$ with a translation score which is higher than 0.6. If not, the weights λ. in the model can be adjusted. This process is then continued with additional training data 28. The parameters of the model 24, in particular, the weights λ (e.g., the average weights from all iterations), are then frozen.

The reranking model 24 is thus trained to predict a precision score AP for each new translation ($t_4$, $t_5$, $t_6$, etc.) output by an SMT system (such as decoder 58 or different SMT system), based on its respective features vector. The reranking component 66 can then select, from the set of translations $t_4$, $t_5$, $t_6$, etc.) of a new query 12, the one(s) ($t_6$ in the example shown in FIG. 5) having the highest predicted precision score AP.

Features

The features whose values are used in Eqn. (1) can be any suitable features which can be extracted from a translation pair (a query and its translation), i.e., an input query and/or its candidate translation or a training query and its translated query).

A Domain-Specific Features

The domain-specific feature(s) can include features based on bilingual in-domain resources (e.g., dictionaries, terminology, statistics extracted from an in-domain parallel corpus etc.) and/or features based on a monolingual in-domain corpus of documents, such as corpus 56, or corpus 32, if accessible to the system.

Given that the monolingual in-domain corpus 56 is much easier to obtain, exemplary features based on the monolingual in-domain corpus are provided by way of example. The target document collection as a monolingual in-domain corpus in our experiments. Below exemplary domain-specific features which can be integrated in the reranking framework are described.

1. Language Models

An n-gram language model can be used for surface and/or lemma forms in the query translation. In the exemplary form, one feature in Eqn. 1 is for the language model surface form and a second feature is for the language model lemma form. The surface form of a word is the word (or longer term) which appears in the query translation. The lemma form is the underlying form or root form. In the case of a noun, the lemma is usually the singular form, for verbs, the infinitive form. In English, many words have the same surface and root forms although in other languages there are often surface forms which are more variable. The surface-based language model of the domain collection can be of the type which is sometimes used as a feature used to train an adapted SMT system. See, for example, Nicola Bertoldi, et al., "Domain adaptation for statistical machine translation with monolingual resources,' in Proc. Fourth Workshop on Statistical Machine Translation, pp. 182-189 (ACL 2009); Bing Zhao, et al., "Language model adaptation for statistical machine translation with structured query models," in Proc. 20th Intern'l Conf. on Computational Linguistics, COLING 2004). Rather than using as a feature of the SMT, here, the language model can be used in the reranking component.

The size of the n-gram (number of words considered) can be, for example, from 1-5, with different values of n being considered. Given ambiguity, this feature favors the most frequent n-gram in the collection as the translation. Thus for example, if n=2 and there are five occurrences of "rive gauche" in the corpus 56 and only 3 occurrences of "banque gauche", the language model feature would favor a query translations 64 containing rive gauche.

The language model counts the occurrences of 1-grams, 2-grams, etc. in the training corpus. Some n-grams may not exist in the training data, so smoothing is applied: for 2-grams, P(x|y)=a*count(yx)/count(y)+b*count(y)/N, N−number of words in the training corpus, where a+b=1. In the example, P(rive gauche)=P(rive|<s>)*P(gauche|rive), P(banque gauche)=P(banque|<s>)*P(gauche|banque)
*P(gauche|<\s>), P(x|y)=count(yx)/count(y), where <s> means beginning of the sentence, <\s> means end of the sentence. In practice, the bigram "banque gauche" should not exist in the training corpus, thus, P(gauche|banque)=b*count(banque). However "rive gauche" may exist, so P(gauche|rive)=a*(count(rive gauche)/count(rive))+b*count(rive). Moreover, the in-domain corpus should contain more occurrences of "rive", thus the value of P(rive gauche) should be larger than P(banque gauche).

2 Out Of Vocabulary (OOV) Words:

This feature is based on a number of words in the translated query that are not present in the collection 32 (and/or 70). Two features can be computed, one for the surface form and one for the lemma form. As will be appreciated, if the surface form is present in the target collection, the lemma is also. Although simple, this feature provides an indication of whether a translation seems 'adapted' for the given collection. The number can be normalized, e.g., to take into account the number of words in the query translation.

As an example, suppose in FIG. 4 that the surface form "quittée" in the third translation does not appear in the collection 32 (and/or 70), but the rest of the words do. This would give a score of 1 for OOV words for the surface form. Suppose that the lemma form of "quittée", the infinitive "quitter", does appear in the collection, i.e., in any of its forms, then the score for the OOV lemma is 0. Since Eqn. 1 is formatted as a maximization, the score of 0 is given a higher feature value for the two OOV features than a score of 1.

3. Query Performance Predictors:

Query Performance predictors are features that have been developed for predicting query difficulty. See, for example, Elad Yom-tov, et al., "Learning to estimate query difficulty: including applications to missing content detection and distributed information retrieval," in SIGIR 2005, pp. 512-519. Several performance predictor methods have been proposed the field of information retrieval and have been found to have a reasonable correlation with performance statistics such as Mean Average Precision in the exemplary method. Exemplary predictors can be computed based on the following equations, e.g., after normalization of the values computed, as explained below:

a) Average Inverse Document Frequency Feature:

$$AvgIDF(q) = \frac{1}{|q|}\sum_{w \in q} IDF(w) \quad (3)$$

b) Maximum Inverse Document Frequency Feature $$MaxIDF(q) = \max_{w \in q} IDF(w) \quad (4)$$

c) Collection Query Similarity (CQS) Feature $$CQS(q) = \sum_{w \in q}(1 + TF(w, \mathcal{C}))IDF(w) \quad (5)$$

d) Information Gain Feature $$GI(q) = \sum_{w,w' \in q} GI(w, w') \quad (6)$$

where |q| is the number of words in the candidate translation 64.

In Equations (3), (4), and (5), IDF(w) is the standard inverse document frequency often used in IR:

$$IDF(w) = \log\frac{D}{1+d}$$

i.e., the logarithm of the total number D of documents in the collection $\mathcal{C}$ (e.g., collection 56) divided by the number d of the documents in the collection containing the word w plus 1 (to account for the case where there are no documents containing the word which would lead to a division by 0).

The IDF-based predictors can measure the specificity of the query as queries composed of infrequent terms (in the document collection) are easier to satisfy. In the exemplary embodiment, they indicate how well the candidate translation is adapted to the domain.

Eqn. (3) sums the IDF over all words in the translated query and divides this by the number of words in the query. This gives a higher number for this feature when the words in the candidate translation 64, on average, appear in fewer of the corpus documents. The MaxIDF(q) feature in Eqn. (4) takes the maximum standard inverse document frequency of all the words in the query. Thus, if some words candidate translation 64 are not found in the document collection, the feature can ignore these.

The TF(w,$\mathcal{C}$) in the CQS feature of Eqn. (5) is the total number of occurrences of word w in the target domain collection 56 (which may be expressed as a frequency). The CQS predictor measures a similarity between the query and the collection, with the expectation that queries which are similar to the collection are easier to answer. This feature provides a trade-off between the frequency of the word and the discriminative power provided by the IDF.

In Eqn. (6), GI(w,w') measures the information gain between two words. The Information Gain is essentially a weighted version of the mutual information between two words in the domain corpora 32 (and/or 70). This has previously been used in IR through lexical entailment models. See, for example, Claudia Hauff, Predicting the effectiveness of queries and retrieval systems, PhD thesis, 2010. This feature looks at co-occurrence of query words. For example, in the candidate t2 in FIG. 4, the system may count how many documents in the collection 56 include Où+est, how many include est+la, how many include la+rive, and how many include rive+gauche, and sum these to provide a value on which this feature is based (e.g., after normalization).

In general, these features either capture a word domain specific behavior or a similarity between the collection and the query. Use of one or more of these features in the exemplary query ranking tends to favor translations 64 that contain words that are adapted to the domain collection. These are intended to be exemplary and it is to be appreciated that other predictors could be used which adapt the reranking to the target domain. In the exemplary embodiment, the features used are not based on access to the documents that are retrieved at test time (this sort of predictors are called pre-retrieval predictors in the field).

In general, the translation quality can be judged according to two aspects:

1. adequacy: how much information is transferred from he original query into its translation;
2. fluency: well-formedness of the translation.

The exemplary domain-specific features introduced above address the "fluency" aspect, although not only in the sense of the "well-formedness" (less important in the case of query translation than in the case of full-text translation), but also in the sense of the "domain-specificity". However, a perfectly in-domain translation may be not adequate (chat noir translated to white dog).

One or more of the following features can be used for controlling the adequacy aspect:

B. Adequacy Features

1. Translation Model

For example, the Moses lexical translation model ($p_{lex}$(f|e), $p_{lex}$(e|f)) features can be used as one of the features. In the real black-box case these features can be calculated with the help of the bilingual dictionaries (e.g., computed with GIZA++). It has been shown that using Giza-based alignments, or the alignments produced directly by an SMT system for features computation in the reranking framework lead to comparable results. (See Vassilina Nikoulina, Modéle de traduction statistique á fragments enrichi par la syntaxe. PhD thesis, Université de Grenoble, 2010)

2. Syntax-Based Features Used for Genre Adaptation

Examples of these features are described in above-mentioned U.S. application Ser. No. 13/173,582. These features count the number of matching Part-of-Speech tags between the original query and its translation, which are weighted by the lexical translation probability.

For example, these may include dependency-based features, such as syntactic dependencies in the candidate translation and/or features used in the TSM 60. Features of the Moses TSM 60 which can be used as features in the reranking include lexical (word) and phrasal translation probabilities (probability of a source word/phrase knowing the target word/phrase, and vice versa), language model features (frequencies of n-grams, such as trigrams, in the translation), and a distortion feature which represents the degree of reordering between the words in the source string and the corresponding words in the target string. In the exemplary embodiment, a subset of the Moses SMT baseline features is used (MOSES). These include only the translation model features that deal with lexical (word) and phrasal probabilities.

Additionally or alternatively, one or more syntactically motivated features may be employed. These are based on the PoS correspondence between source query and its translation. Two features of this type are given by way of example: POS and LEX, which are not among the Moses baseline features. These features may be computed as follows: in a translation pair output by the SMT system, each element (word or short phrase) 70 in the query is aligned with a corresponding element (word or short phrase) 72 in the translation, as illustrated in FIG. 4 The elements are also labeled with PoS tags. PoS tags can be selected for example from a finite set, e.g., the set: verbs, nouns, pronouns, adverbs, adjectives, prepositions, conjunctions, and determiners, or variants thereof. One feature is based on the PoS tags of aligned pairs of elements, on element in the source q and the other in the target t. In the case where multiple (e.g., two or more) words in the source side are aligned with one target word, a part of speech pair can be extracted for each pair of source word and same target word (and vice versa). A feature can be introduced for each pair of aligned elements, i.e., each pair of aligned PoS tags (based on word alignments produced by Moses) in the training set. For example, in the English query: left (ADJ) bank (NOUN) may be translated in French as banque (NOUN) quittée (VERB), as in $t_3$ shown in FIG. 4, where left is aligned with quittée and bank with banque. The two features introduced for this example will be: f_noun-verb and f_noun-noun.

The number of occurrences of each of these features in the translation pair can be counted to provide a set of POS feature values. For example, the system counts, for each candidate translation, a number of occurrences of each specific pair of PoS tags (f_noun-noun=1 and f_noun-verb=1, and f_verb-noun=0, for example, in the above example).

Another feature, LEX weights the generic PoS map feature by a lexical alignment score $p_f$ (bank|banque) or $p_r$ (banque|bank). The lexical alignment score $p_f$ or $p_r$ may be retrieved from the biphrase library 62 as the frequency of occurrence of the second term as a translation of the first in the parallel training corpus of aligned sentences. Thus for example, if bank is translated as banque in 50% of all occurrences in the training corpus and (f_noun-noun)=1 for the translation pair, then the value of the LEX feature (f_noun-noun) $p_f$=1×0.5=0.5.

The vector of all possible PoS pairs could be relatively large (e.g., when there is one feature for each of all possible combinations of eight different parts of speech) and sparse, particularly in the case of a relatively small training set of training queries (e.g., about 400 examples). Thus, to avoid overfitting, only the PoS tag pairs which are above a certain frequency threshold in the training corpus may be considered. For example, only the top about 20 (e.g., 21) of the possible PoS tag pairs are considered to compute the POS and LEX features. This gives a feature vector of about 40 values for the two features, which, when added to the features selected from the baseline Moses system, provides a features vector with a manageable number of values.

Other features which can be used are syntactic coupling features. Features of this type are described in Nikoulina, V. and Dymetman, M., "Experiments in discriminating phrase-based translations on the basis of syntactic coupling features," in *Proc. 2nd Workshop on Syntax and Structure in Statistical Translation* (SSST '08), pp. 55-60, David Chiang and Dekai Wu (Eds.). Association for Computational Linguistics, Stroudsburg, Pa. (2008) and. These coupling features are based on the syntactic dependencies between pairs of respective words which are aligned in the respective query/translated query. To make use of this type of feature, a parser for each of the languages is used to extract the syntactic dependencies. A suitable parser is the Xerox Incremental Parser (XIP). Then, for each set of combinations (q', q", t', t"), feature values can be computed based on a syntactic dependency, if any, between q' and q" and between t' and t", where q' and q" are elements from q that are aligned with elements t' and t" from t, respectively. Thus, for example, in the second pair shown in FIG. 4, left in q is in a MODIFIER type syntactic dependency with the element, bank, and in the translation $t_2$, gauche, which is aligned with left is also in a MODIFIER type of dependency with the element rive that is aligned with bank, thus, the dependency pair (coupling feature) MOD,MOD could be extracted. This pair of dependencies can thus be assigned a feature value which can be summed over all such dependencies in the pair. In other pairs of q and t, the dependency pair(s) may be different (see, for example, the third pair, $q,t_3$).

These features can also be adapted to the specific domain by using lexical probabilities learned on in-domain parallel or comparable corpora, etc.

Other methods for adapting the method to a specific domain may be incorporated into the exemplary method. For example, an external resource (such as Wikipedia) may be used to map the query to a set of abstract domain-specific concepts which can be used for query expansion/adaptation. Another approach is to enrich the underlying translation system with domain-specific phrase dictionaries mined from Wikipedia.

For example, the Wikipedia or Wiktionary-mined concepts can be used to expand the top ranked queries after the reranking framework has been applied, and the Wikipedia-based dictionary can be used as additional features in the reranking model. In that sense, the reranking framework is still very useful to focus on the domain-specific translations which might otherwise be lost among the more generic translations which prevail in the initial corpora.

As will be appreciated, in the learning of the weights for the features, those features which correlate less well with retrieval performance are accorded less weight. By reviewing the set of feature weights in the trained model, those features with weights which are below a threshold value can be identified and optionally dropped from the model 24.

Translation Scoring (S110)

In the exemplary embodiment, the optimum translation (query candidate) is the one which maximizes the translation score, over all translations $t_i$ in set 64. As noted above, the translation score is a weighted function of the features computed for the candidate translation and can be defined as a weighted linear combination of the values of the features as for Eqn. 1 above.

In the retrieval phase, the feature values may be normalized by taking the top N-best translations of a query from the translation model, computing the score for each feature, and for each feature normalizing by computing the mean and variance.

It is to be appreciated that the terms "optimum" and "maximization," and similar phraseology are to be broadly construed, herein, as one of ordinary skill in the art would understand these terms. For example, these terms are not to be construed as being limited to the absolute global optimum value. For example, maximization of a function may employ an iterative maximization algorithm that terminates at a stopping criterion before an absolute maximum is reached.

In the exemplary embodiment, however, the scoring function is simply a dot product in which each feature value is simply weighted by its appropriate weight and the weighted feature values are summed. The candidate translation, or set of candidate translations, producing the highest score are output. As will be appreciated, there may be further processing of the queries before being output to a user An advantage of the exemplary reranking approach is that it allows optimizing the reranking model towards an information retrieval (IR) score. Moreover, as the average query length is typically about 5 words, this allows obtaining much more diversity in the Nbest list of candidate translations than in the case of general phrase translation, where the average length of each source string is about 25 words.

The method illustrated in FIGS. 2 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 3, can be used to implement the query translation method.

The exemplary system and method enable a general SMT system to be adapted for query translation in a specific domain by using the reranking framework. The approach allows performing parameter optimization by maximizing the IR score for a training set and thus integrating query and retrieval in the same framework. At the same time, this approach keeps the query translation at the test time independent of any document indexing. This feature makes it well-adapted to query translation services and especially to cases in which accessing the document collection at retrieval time, by the service, is not possible. The access to a document collection for creating a training set can be replaced by an annotated training set produced by a content provider wishing to adapt the MT system to its needs.

The annotated training set can also be created with queries and human-produced translations into the target language (which may be easier to create then relevance annotations), and the documents retrieved with these translations can be marked as the relevant ones for the source query.

The reranking framework allows for a lot of flexibility in enriching the baseline translation model with new, more complex features. The approach also enables the optimization to be performed towards a goal function adapted for the purposes (an IR-based score).

A notable line of work in domain adaptation for CLIR and MT focuses on finding or generating appropriate domain-specific resources and then tuning the MT or CLIR models based on these resources. Such resources for example may be "pseudo" in-domain corpora generated by choosing the instances from available parallel corpora close to the test set or to the available in-domain corpora (see, Almut Silja et al., "Adaptation of the translation model for statistical machine translation based on information retrieval," in Proc. 10th Conf. of the European Association for Machine Translation (EAMT), Budapest, May 2005; Amittai Axelrod, et al., "Domain adaptation via pseudo in-domain data selection," in Proc. 2011 Conf. on Empirical Methods in Natural Language Processing, pages 355-362, Edinburgh, Scotland 2011; and Monica Rogati and Yiming Yang, "Resource selection for domain-specific crosslingual ir," in Proc. 27th Ann. Intern'l ACM SIGIR Conf. on Research and development in information retrieval, SIGIR '04, pages 154-161, New York, 2004. ACM). The new model is then trained or enriched based on the newly generated domain-specific corpora (or dictionaries). In Rogati, for example domain adaptation is addressed by automatically choosing the domain-specific subcorpora from existing resources based on different features (mostly lexical similarity).

Instead of finding appropriate resources and retraining the MT or CLIR system as described above, the target monolingual corpus or feedback from the target data set is used to achieve domain-specific CLIR. This can be done using for example pseudo-relevance feedback (see, Stephane Clinchant and Jean-Michel Renders. Query translation through dictionary adaptation. In CLEF Working Notes, pages 182-187, 2007; U.S. Pub. No. 20100070521, published Mar. 18, 2010, entitled QUERY TRANSLATION THROUGH DICTIONARY ADAPTATION) or by computing lexical and translation probabilities based on the target monolingual corpus.

Both of the compared approaches imply access to an actual CLIR system and/or underlying MT system at translation time and/or to the target document set. The present method avoids reliance on such resources and can be applied in the case of the translation service that IR providers can access without providing access to their underlying search engines. They can then adapt this system to their needs by providing additional statistics about their target document set. The present approach can also function in the case that the underlying Machine Translation system is viewed as a black box (given that such a system can produce a list of candidate translations) or be applied for a combination of different translation resources.

Most of the existing work addressing CLIR domain adaptation require changing the underlying IR engine or an access to a document collection at run time or involve external resources for query expansion. Other approaches focus on the existing parallel in-domain resources in order to adapt query translation model. The present method may be used to complement to the first group of the approaches: the reranking can be seen as a layer of the query translation module. Thus, it can choose the best translation, out of different translations proposed by different MT engines, or different query translation techniques (dictionary-based). Query-expansion techniques (e.g., Wikipedia-based semantic enrichment, or Pseudo-Relevance Feedback) can be further applied to the 1best or 5best translations proposed by the method. For example, the exemplary method can include:

1. treating the SMT system as a black box;
2. treating the IR system as a black box;
3. dealing with genre adaptation and domain adaptation at once;
4. complementary query expansion techniques which are proved to be helpful in CLIR, and combinations thereof.

Without intending to limit the scope of the exemplary embodiment, the following examples demonstrate the applicability of the method.

EXAMPLES

As an SMT system, the Moses baseline system was trained on a parallel corpus of bi-sentences (French-English Europarl). Training data 28 for training the reranking model was generated from the parallel queries from the following CLEF tasks: AdHoc-Main 2000-2003, AdHoc-TEL 2008, Geo-CLEF 2006-2007, Domain Specific 2004-2007 tracks. The resulting training set has in total 450 parallel queries.

For testing the trained system, the CLEF AdHoc-TEL 2008 task for English-German retrieval was used. (See, Vivien Petras, Stefan Baerisch The Domain-Specific Track at CLEF 2008, see: clef.isti.cnr.it/2008/working_notes/overview-ds-clef-2008.pdf)

These queries were translated with the trained Moses baseline system and the translated queries assigned an AP score, based on the retrieval scores of the documents retrieved.

The domain specific task includes data in the social sciences domain. In the experiments, only the topics (and not the description of each topic) were used, so that the genre is similar to queries used in information retrieval.

The English-German cross-lingual retrieval was performed as follows:

1. The original query (in English) is first translated into the language of the collection (German). This translation is used to search the target collection, the Social Science German Indexing and Retrieval Test database (GIRT) (with the lemur toolkit). See Paul Ogilvie and James P. Callan, "Experiments using the lemur toolkit," in TREC 2001, for a description of the lemur toolkit.

The baseline translation model 60 is trained on the Europarl parallel corpus with the Moses open source toolkit (Philipp Koehn, et al., "Moses: open source toolkit for statistical machine translation," In ACL'07: Proc. 45th Annual Meeting of the ACL on Interactive Poster and Demonstration Sessions, pages 177-180, Prague, Czech Republic, 2007. Association for Computational Linguistics).

The test set is evaluated using the Mean Average Precision (MAP) metric, as the final goal is cross-lingual domain specific information retrieval. The bilingual scores are computed after performing a monolingual retrieval with either the best translation or a concatenation of the 5 best translations proposed by the baseline model. The 1best MAP score corresponds to the case when the single translation is proposed for the retrieval by the query translation model. The 5best MAP score corresponds to the case when the 5 top translations proposed by the translation service are concatenated and used for the retrieval. The 5best retrieval can be seen as a sort of query expansion, without accessing the document collection or any external resources.

The following reranking models (defined by the features combination) were evaluated MOSES TM: using only Moses translation model features that deal with lexical or phrasal probabilities.

MOSES+LEX: the MOSES TM features above enriched with lexical translation (LEX) features (for the top 21 POS features).

MOSES+POS+LEX: MOSES TM+lexical weighted PoS tags mapping features (used for genre adaptation—the features in these experiments count the number of matching Part-of-Speech tags between the original query and its translation, which are weighted by the lexical translation probability);

DOMAIN: the domain-specific features described above (surface- and lemma-based Language Model, surface and lemma OOV, and the four predictors).

Since the features combined are of different nature (counts, probabilities) features normalization is applied. Only comparisons of different translations of the same query are made. Thus, the feature normalization is performed "per query": mean and variance of each of the features for each query are computed for the Nbest 1000-list.

Results are shown in Table 1.

TABLE 1

Mean Average Precision of the reranking for domain adaptation with domain-specific features and other features

| Adaptation | Model | 1-best MAP | 5-best MAP |
|---|---|---|---|
|  | Baseline | 0.1920 | 0.1995 |
| Genre | MOSES + LEX | 0.2015 | 0.2497 |
|  | MOSES + POS + LEX | 0.1987 | 0.2622 |
| Genre + Domain | DOMAIN + MOSES + LEX | 0.2509 | 0.2654 |
|  | DOMAIN + MOSES + POS + LEX | 0.2482 | 0.2544 |

The results of the reranking with/without domain-specific features are reported in the first three rows of Table 1. The Baseline results correspond to simply taking the first (or 5-top) translation(s) of produced by the baseline MT system (Moses trained on Europarl). The Genre results use the methods outlined in application Ser. No. 13/173,582. The Genre+Domain results in the last two lines show the results of the exemplary domain adaptation performed simultaneously with genre-adaptation. The domain-specific features give a significant improvement for the 1 best MAP results. Indeed, using more adapted translation leads to a better retrieval. The 5best MAP improvements illustrate that genre adaptation via reranking framework with domain-specific features outperforms significantly the baseline results.

In summary, the exemplary system and method has been shown to be more effective, more suited to the task of domain adaptation and is applicable in a wide variety of applications, including adaptation of a unique SMT system, combination of different translation resources, lattice translation generated out of multiple candidates, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A translation method comprising:
receiving an input query in a source language;
translating the input query with a phrase-based statistical machine translation system to generate a set of candidate translations of the input query in a target language;
extracting a set of features from each of the candidate translations in the set, the set of features including at least one domain specific feature which is based on a comparison of at least one term in the candidate translation with words in a domain-specific corpus of documents;
scoring each of the candidate translations with a scoring function in which the extracted features are weighted with respective weights, the weights having been learned on:
features extracted from translated queries, each of the translated queries having been generated by translation of an original query from a set of original queries into the target language with a machine translation system, and
a measure of information retrieval performance of each of the translated queries, for each original query in the set of original queries, the information retrieval performance of each translated query being based on a relevance score, with respect to the respective original query, for documents in a set of documents that have been retrieved in response to the translated query; and
outputting a target query in the target language based on the scores of the candidate translations.

2. The method of claim 1, wherein at least one of the translating, extracting, and scoring is performed with a computer processor.

3. The method of claim 1, wherein the outputting comprises outputting the target query to a search engine and retrieving information based on the target query.

4. The method of claim 1, wherein the target query is based on at least one of the candidate translations.

5. The method of claim 1, wherein the outputting comprises:
ranking the candidate translations based on scores of the candidate translations; and
selecting at least one of the more highly ranked candidate translations to form the target query.

6. The method of claim 1, wherein the scoring comprises computing a translation score for each of the candidate translations as a weighted linear combination of its extracted features.

7. The method of claim 1, wherein the method includes outputting, as the target query, a candidate translation which satisfies:

$$S_i(\lambda) = \mathrm{argmax}_{t \in GEN(q)} \lambda \cdot F(t) \quad (1)$$

where t∈(GEN(q)) represents a candidate translation generated from a source query q, and λ represents a set of feature weights learned in training, one weight for each of the features in F(t).

8. The method of claim 1, wherein at least one of the extracted features is based on parts of speech for the candidate translations.

9. The method of claim 8, wherein at least one of the part of speech features is based on a part of speech for an element of the candidate translation and a corresponding part of speech of an element of the input query with which the element of the candidate translation is aligned in the translation, wherein each of the elements comprises at least one word.

10. The method of claim 9, wherein the at least one of the part of speech features is also based on a frequency of the element in the candidate translation as a translation of element of the input query in a training corpus of bi-sentences, each bi-sentence including a sentence in the source language and a sentence in the target language.

11. The method of claim 1, wherein the translating of the input query with the machine translation system comprises:
retrieving a set of biphrases, each biphrase comprising at least one word of the input query in the source language and at least one corresponding word in the target language; and
with a translation scoring model, computing a set of the retrieved biphrases to cover the input query, for each of the set of candidate translations, each candidate translation comprising the corresponding words in the target language forming the set of retrieved biphrases.

12. The method of claim 1, wherein the information retrieval performance of each translated query is determined with respect to at least one of the original query and a reference translation thereof in the target language.

13. The method of claim 1, wherein the method further comprises, prior to receiving the input query, learning feature weights for the features in the set.

14. The method of claim 13, wherein the learning of the feature weights is performed with the margin infused relaxed algorithm.

15. The method of claim 1, wherein at least one of the features is a feature which is not used in generating the translation of the input query.

16. A domain-specific translation method comprising:
receiving an input query in a source language;
with a machine translation system that is not adapted to a specific domain, translating the query to generate a set of candidate translations of the query in a target language;
extracting a set of features from each of the candidate translations in the set, the set of features including at least one domain specific feature which is based on a comparison of at least one term in the candidate translation with words in an associated domain-specific corpus of documents in the target language;
scoring each of the candidate translations with a scoring function in which the extracted features are weighted with respective weights, the weights having been learned on features extracted from translated queries, each generated by translation of an original query into the target language, and a measure of information retrieval performance of each the translated queries for each original query in a set of original queries, the information retrieval performance being assessed on a domain-specific target document collection in which documents in the collection are annotated based on relevance to the original queries; and
outputting a target query based on the scores of the candidate translations, wherein the at least one domain-specific feature is selected from the group consisting of:
a) a language model feature;
b) an out of vocabulary word feature;
c) a query performance predictor which is computed with an equation that correlates with the measure of information retrieval performance; and
combinations thereof.

17. The method of claim 16, wherein the at least one domain-specific feature comprises a language model feature which, for a candidate translation, is based on a frequency of occurrence of an n-gram of terms of the candidate translation within the domain-specific corpus, where n is at least one and each of the terms comprises a word of the candidate translation or a lemma form thereof.

18. The method of claim 16, wherein the at least one domain-specific feature comprises an out of vocabulary word feature which, for a candidate translation, is based on a number of terms in the candidate translation that are not present within the domain-specific corpus, where each of the terms comprises a word of the candidate translation or a lemma form thereof.

19. A translation method comprising:
receiving an input query in a source language;
with a machine translation system, translating the query to generate a set of candidate translations of the query in a target language;
extracting a set of features from each of the candidate translations in the set, the set of features including at least one domain specific feature which is based on a comparison of at least one term in the candidate translation with words in a domain-specific corpus of documents;
scoring each of the candidate translations with a scoring function in which the extracted features are weighted with respective weights, the weights having been learned on features extracted from translated queries, each generated by translation of an original query into the target language, and a measure of information retrieval performance of each the translated queries, for each original query in a set of original queries; and
outputting a target query based on the scores of the candidate translations,
wherein the at least one domain-specific feature comprises a query performance predictor which, for a candidate translation, is based on at least one of:

a) Average Inverse Document frequency, computed according to the expression:

$$AvgIDF(q) = \frac{1}{|q|} \sum_{w \in q} IDF(w) \quad (3)$$

b) Maximum Inverse Document Frequency, computed according to the expression:

$$MaxIDF(q) = \max_{w \in q} IDF(w) \quad (4)$$

c) Collection Query Similarity (CQS), computed according to the expression:

$$CQS(q) = \sum_{w \in q} (1 + TF(w, \mathcal{C}))IDF(w), \text{ and} \quad (5)$$

d) Information gain, computed according to the expression:

$$GI(q) = \sum_{w, w' \in q} GI(w, w') \quad (6)$$

where |q| is the number of words in the candidate translation;
w represents a word in the candidate translation;
IDF(w) is the inverse document frequency which a function of a number of documents in the domain-specific corpus of documents that include the word w;
TF(w,$\mathcal{C}$) is based on a total number of occurrences of the word w in the domain-specific corpus of documents; and
GI(w,w') is a function of co-occurrence of two words of the candidate translation in documents in the domain-specific corpus.

20. A computer program product comprising a non-transitory computer-readable recording medium which stores instructions for performing a translation method, comprising:
receiving an input query in a source language;
translating the input query with a phrase-based statistical machine translation system to generate a set of candidate translations of the input query in a target language;
extracting a set of features from each of the candidate translations in the set, the set of features including at least one domain specific feature which is based on a comparison of at least one term in the candidate translation with words in a domain-specific corpus of documents;
scoring each of the candidate translations with a scoring function in which the extracted features are weighted with respective weights, the weights having been learned on:

features extracted from translated queries, each of the translated queries having been generated by translation of an original query from a set of original queries into the target language with a machine translation system, and a measure of information retrieval performance of each of the translated queries, for each original query in the set of original queries, the information retrieval performance of each translated query being based on a relevance score, with respect to the respective original query, for documents in a set of documents that have been retrieved in response to the translated query; and outputting a target query in the target language based on the scores of the candidate translations.

21. A translation system comprising non-transitory memory which stores instructions for translating an input source language query to generate a set of the candidate translations in a target language and a processor in communication with the memory for executing the instructions, comprising:

receiving an input query in a source language;

translating the input query with a phrase-based statistical machine translation system to generate a set of candidate translations of the input query in a target language;

extracting a set of features from each of the candidate translations in the set, the set of features including at least one domain specific feature which is based on a comparison of at least one term in the candidate translation with words in a domain- specific corpus of documents;

scoring each of the candidate translations with a scoring function in which the extracted features are weighted with respective weights, the weights having been learned on:

features extracted from translated queries, each of the translated queries having been generated by translation of an original query from a set of original queries into the target language with a machine translation system, and a measure of information retrieval performance of each of the translated queries, for each original query in the set of original queries, the information retrieval performance of each translated query being based on a relevance score, with respect to the respective original query, for documents in a set of documents that have been retrieved in response to the translated query; and outputting a target query in the target language based on the scores of the candidate translations.

22. A query translation system comprising:

a statistical machine translation system including a decoder which receives a source query in a source language and outputs a set of candidate translations in a target language using biphrases extracted from a biphrase library, each of the candidate translations being a translation of the same source query; and a reranking component which outputs a target query in the target language based on at least one of the candidate translations, the reranking component extracting features of each of the candidate translations and computing a function in which the extracted features are weighted by feature weights, the weights having been learned on features of each of a set of translated queries generated by translation of an original query into the target language and a measure of information retrieval performance of each the translated queries from a collection of domain-specific documents in which documents in the collection are annotated based on relevance to original queries, for each original query in a set of original queries, at least one of the features comprising a domain-specific feature; and a processor which implements the reranking component.

23. The query translation system of claim 22, wherein the at least one domain-specific feature is based on a comparison of at least one word in the candidate translation with words in a domain-specific corpus of documents.

24. The query translation system of claim 22, wherein the decoder comprises a phrase-based statistical machine translation system.

25. The query translation system of claim 22, wherein the system has access to at least one of: a domain-specific document corpus for computing the features, and statistics extracted from the domain specific document corpus.

26. A method for training a translation system for domain-adapted translation of queries, comprising:

for each of a set of original queries in a source language:
    translating the query to generate a set of translations in a target language;
    for each translation in the set of translations, extracting values of features for each of a finite set of features, at least one of the features comprising a domain-specific feature which relies on a domain-specific corpus; and
    obtaining a measure of retrieval performance for each translation based on annotations of documents retrieved from a domain-specific corpus with the translation, the document annotations being based on a relevance of each document to original queries in the set of original queries;

learning feature weights for each of the features based on the extracted values of the features and the respective measure of retrieval performance of each translation; and storing the feature weights for use in translating a new query, different from each of the original queries, from the source language to the target language, whereby candidate translations of the new query are ranked based on their respective extracted values of features and the stored feature weights.

* * * * *